(12) United States Patent
Kashimada (10) Patent No.: US 7,738,144 B2
(45) Date of Patent: Jun. 15, 2010

(54) DOCUMENT READING DEVICE AND IMAGE FORMING APPARATUS USING THE SAME

(75) Inventor: Yasushi Kashimada, Aichi (JP)

(73) Assignee: Ricoh Company, Ltd., Tokyo (JP)

( * ) Notice: Subject to any disclaimer, the term of this patent is extended or adjusted under 35 U.S.C. 154(b) by 976 days.

(21) Appl. No.: 11/408,965

(22) Filed: Apr. 24, 2006

(65) Prior Publication Data

US 2006/0245010 A1     Nov. 2, 2006

(30) Foreign Application Priority Data

Apr. 28, 2005    (JP)    ............... 2005-132958

(51) Int. Cl.
H04N 1/04    (2006.01)

(52) U.S. Cl. .................. 358/474; 358/498; 358/486; 358/487; 358/448; 399/373; 399/367; 271/186; 271/3.08; 271/207; 355/75; 355/308

(58) Field of Classification Search .............. 358/474, 358/487, 498, 505, 506, 448; 399/365, 367, 399/371, 374, 203, 373; 271/225, 110, 125, 271/207, 186, 197, 212, 3.08, 94, 98, 902, 271/65; 355/308, 309, 75
See application file for complete search history.

(56) References Cited

U.S. PATENT DOCUMENTS

| 4,954,847 | A | * | 9/1990 | Murata et al. ............... 399/374 |
| 5,220,393 | A | * | 6/1993 | Otomo ....................... 399/125 |
| 5,292,113 | A | * | 3/1994 | Morigami et al. ............... 271/7 |
| 5,339,139 | A | * | 8/1994 | Fullerton et al. ............ 399/203 |
| 5,452,067 | A | * | 9/1995 | Matsuo et al. ............... 399/367 |
| 5,515,153 | A | * | 5/1996 | Tokunoh ..................... 399/374 |
| 5,682,227 | A | * | 10/1997 | Taguchi et al. ................ 355/25 |
| 5,732,308 | A | * | 3/1998 | Miura ......................... 399/32 |
| 2004/0233480 | A1 | * | 11/2004 | Tehrani ..................... 358/474 |
| 2007/0172276 | A1 | * | 7/2007 | Wang et al. ................. 399/367 |

FOREIGN PATENT DOCUMENTS

| JP | 55-97734 | 7/1980 |
| JP | 57-72429 | 5/1982 |
| JP | 6-222479 | 8/1994 |
| JP | 8-195852 | 7/1996 |
| JP | 8-234330 | 9/1996 |
| JP | 2652021 | 5/1997 |
| JP | 9-244161 | 9/1997 |
| JP | 10-153889 | 6/1998 |
| JP | 2000-201251 | 7/2000 |
| JP | 2000-244718 | 9/2000 |
| JP | 2002-350997 | 12/2002 |
| JP | 2004-347649 | 12/2004 |

* cited by examiner

Primary Examiner—Negussie Worku
(74) Attorney, Agent, or Firm—Oblon, Spivak, McClelland, Maier & Neustadt, L.L.P.

(57) ABSTRACT

A document reading device of the present invention includes a glass platen on which a document is to be laid and document reading means including scanning optics for reading the image of the document laid on the glass platen. A document pressing member presses the document against the surface of the document table. The document pressing member is removably mounted to the body of the document reading device by hook and loop fasteners.

16 Claims, 8 Drawing Sheets

DOCUMENT READING DEVICE AND IMAGE FORMING APPARATUS USING THE SAME

BACKGROUND OF THE INVENTION

1. Field of the Invention

The present invention relates to a copier, facsimile apparatus, printer, plotter, stencil printer or similar printer, multifunction machine or similar image forming apparatus and more particularly to a document reading device mounted on such an image forming apparatus, a document reading device including a scanner or similar image reading unit and a cover plate mounted on the document reading device.

2. Description of the Background Art

It is a common practice with a document reading device mounted on an image forming apparatus or an image reading device including a scanner or similar image reading unit to include a cover plate configured to press a document against a glass platen or similar document table or to provide an ADF (Automatic Document Feeder) with such a cover plate. This kind of document reading device is taught in, e.g., Japanese patent laid-open publication Nos. 8-195852, 8-234330, 9-244161 and 6-222479 and Japanese Patent No. 2652021.

Japanese patent laid-open publication No. 8-195852, for example, teaches a cover plate configured separately from an ADF structural body which is heavy.

A scanner or similar image reading device or a document reading device has customarily been required to selectively use light or white background or dark or black background when processing an input image. However, it is necessary for a user needing black background to prepare a black background member beforehand and substitute it for a white or usual background member, limiting serviceability or operability available with the document reading device.

SUMMARY OF THE INVENTION

It is an object of the present invention to allow, by removably mounting a document pressing member or cover plate configured to press a document against a glass platen to the body of a document reading device, the document pressing member to be easily replaced when broken or otherwise damaged for thereby enhancing serviceability or operability.

A document reading device of the present invention includes a body, a document table on which a document is to be laid, a document reading unit including scanning optics for reading the image of the document, a document pressing member configured to press the document against the surface of the document table, and a mounting/dismounting device for removably mounting the document pressing member to the body.

An image forming apparatus using the above document reading device is also disclosed.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENTS

To begin with, the problem with the conventional document reading device will be described specifically with reference to FIG. 1. A scanner or similar image reading device or document reading device is required to selectively process an input image with light background or white background, which is usual background, or dark or black background, as stated previously.

Figure 1:
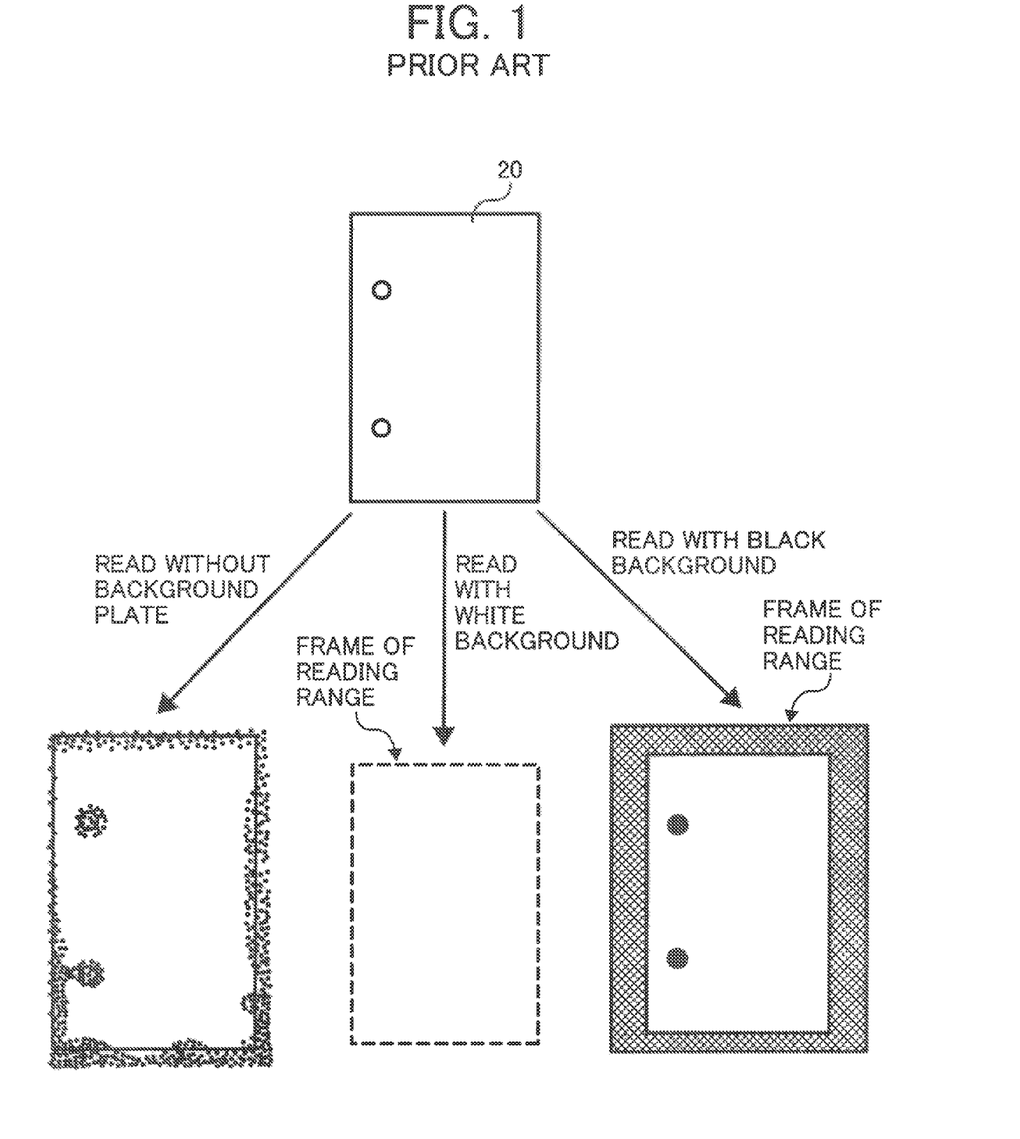
FIG. 1 is a view for describing the problem with the conventional image reading device or document reading device.
Figure 2:
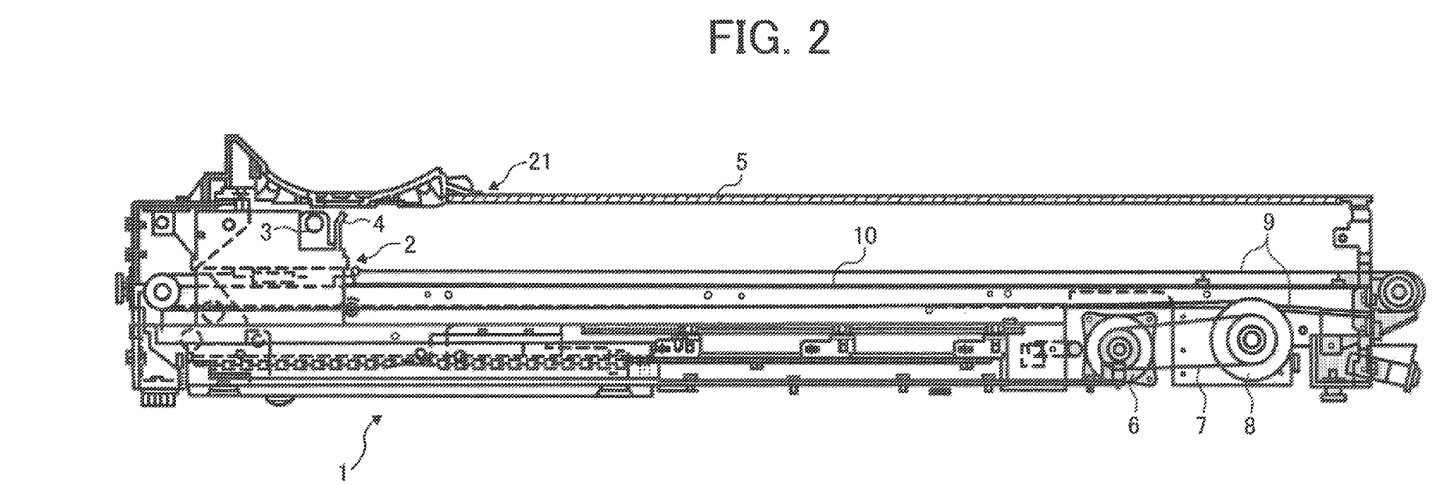
FIG. 2 is a view showing a document reading device embodying the present invention.

As shown in FIG. 1, when a document 20 with white background is read with white background in a designated size, it is possible to scan the document 20 without being effected by the edges of the document 20 or shadows around punch holes formed in the document 20. On the other hand, when the document 20 is read with black background, it is possible to accurately recognize the size of the image because the edges and the background are entirely different in color from each other.

However, because background has customarily been white in most of conventional document reading devices, it is necessary for users requiring black background to prepare a black back ground member beforehand and substitute it for a white background member, resulting in troublesome work or low serviceability.

Preferred embodiments of the present invention and modifications thereof, capable of solving the problem stated above, will be described with reference to the accompanying drawings hereinafter. In the embodiments and modifications, identical structural parts and elements are designated by identical reference numerals and will not be repeatedly described in order to avoid redundancy. Also, even steps, information or structural parts and elements that should originally be shown in the figures are sometimes omitted when not essential in the description.

Referring to FIG. 1, a document reading device embodying the present invention is shown and generally designated by the reference numeral 1. As shown, the document reading device 1 includes a glass platen 5, which is a transparent document table on which a document, not shown, is to be laid, and image reading means including scanning optics for reading the image of the document laid on the glass platen. The glass platen 5 and structural parts and elements constituting the image reading means are arranged in the box-like casing or body of the document reading device 1, although not shown specifically.

In FIG. 1, a cover plate or document pressing member configured to elastically press the above document against the surface of the glass platen or document table 5 and an ADF openable away from the glass platen 5 are shown as being dismounted from the casing of the document reading device 1. The cover plate and ADF will be described specifically later.

As shown in FIG. 1, the scanning optics of the document reading device 1 includes a lamp or light source 3 for illuminating the image surface of a document not shown. A CCD (Charge Coupled Device) module 2 is loaded with a reflector 4 for reflecting light from the lamp 3 toward the image surface of the document, a focusing lens or similar focusing device, not shown, and a CCD image sensor or similar image sensor not shown. A wire 9 is anchored to the CCD module 2 at one end and taken up by a wire pulley 8 via a plurality of wire pulleys. A drive motor or optics drive means drives the wire pulley 8 via a timing belt 7. Guide rails or guide means 10 guide the CCD module 2 in the subscanning direction, i.e., right-and-left direction in FIG. 1.

In operation, after a document has been laid on the reading surface of the glass platen 5, the drive motor 6 drives the wire pulley 8 via the timing belt 7 such that the wire pulley 8 takes up the wire 9. Consequently, the CCD module 2 is moved along the guide rail 10 in the subscanning direction while illuminating the image surface of the document with the lamp 3 and reflector 4. The resulting reflection from the document is incident on, e.g., the CCD image sensor and converted to a corresponding electric signal thereby.

Figures 3A, 3B:
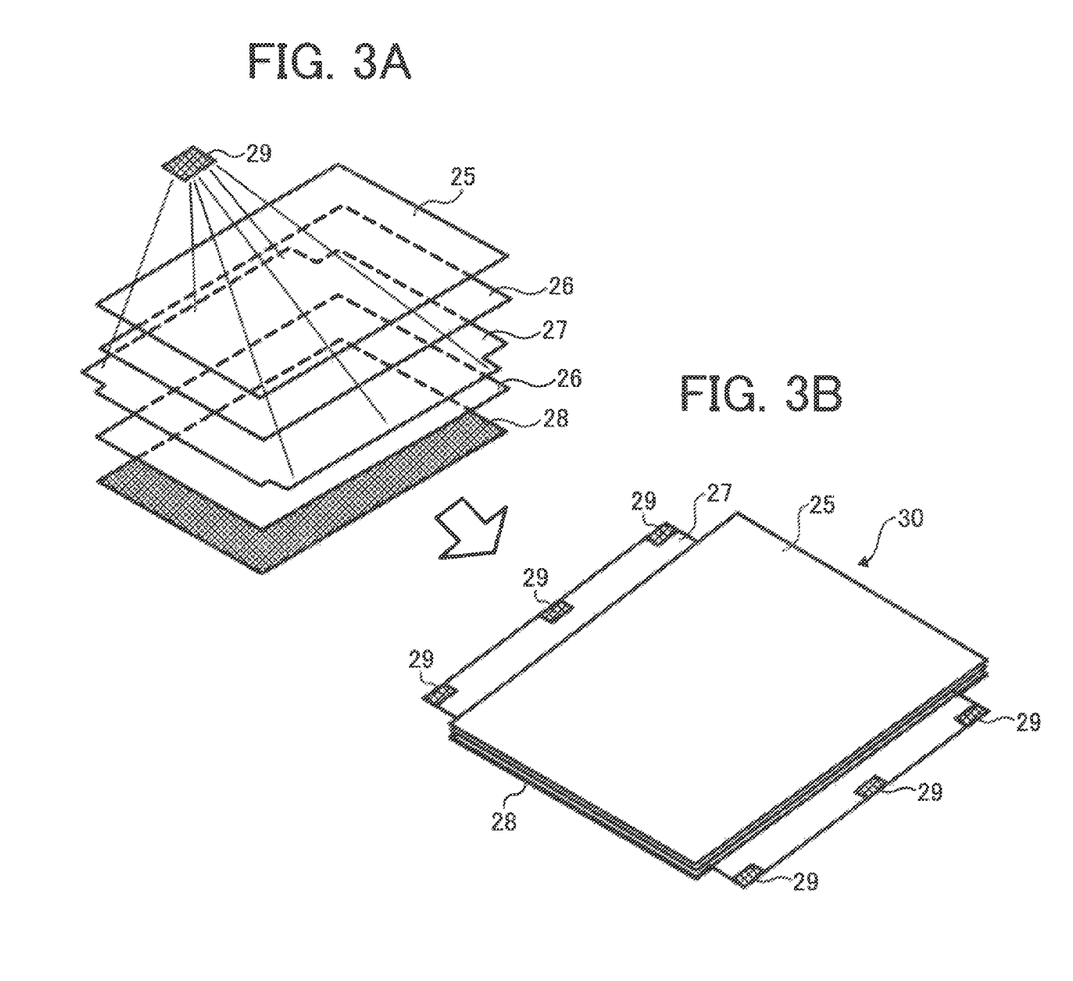
FIG. 3A is an exploded perspective view showing the configuration of a cover plate included in the illustrative embodiment.
FIG. 3B is an isometric view showing essential part of the cover plate in an assembled condition.

The document is positioned on the glass platen 5 with its one edge abutted against a contact reference 21 included in a main-scan scale and is then elastically pressed against the document surface of the glass platen 5 by a cover plate or document pressing member 30, see FIGS. 3A and 3B.

Figure 5:
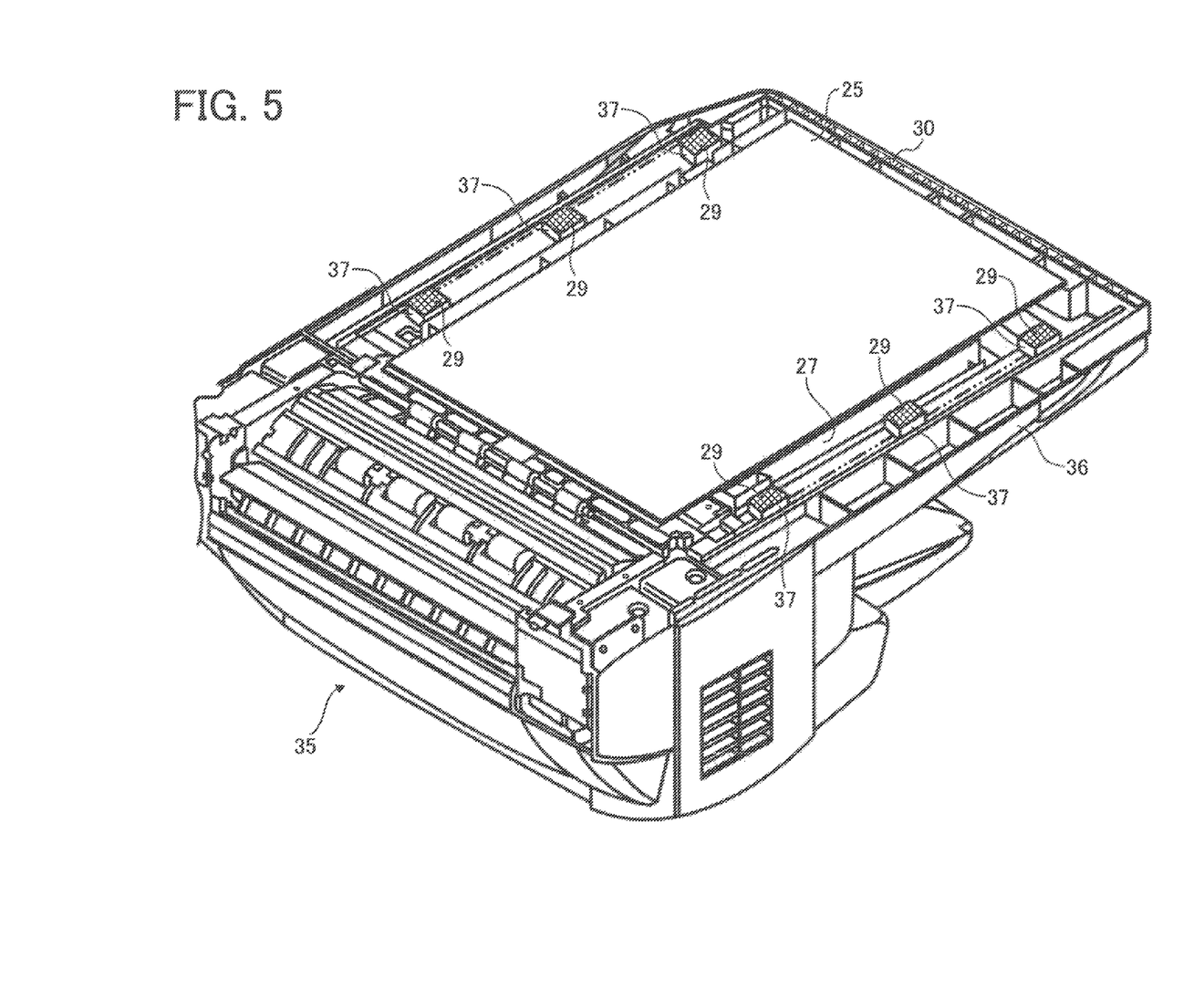
FIG. 5 is an isometric view showing essential part of the reverse side of the ADF.
Figure 6:
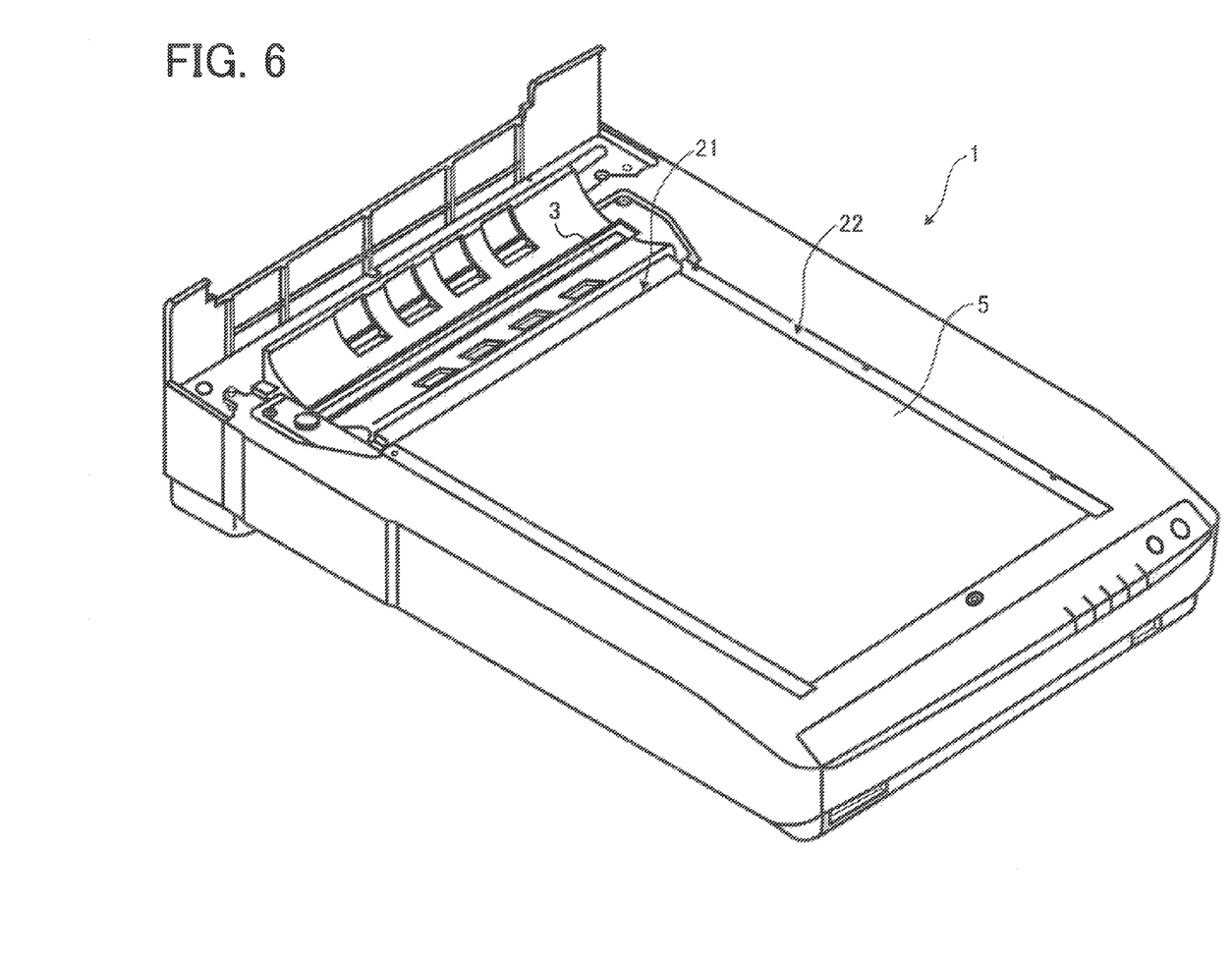
FIG. 6 is an isometric view showing the document reading device from which the ADF is removed.

As shown in FIGS. 3A and 3B, in the illustrative embodiment, the cover plate 30 is characterized in that it is provided with a front and a reverse surface implementing the selective use of white background and black background and is, as shown in FIG. 5, removably mounted to the portion of an ADF 35 facing the glass platen 5 of the document reading device, i.e., the reverse side of the ADF 35. The ADF 35 plays the role of document pressing means for elastically pressing a document, not shown, against the glass platen 5 in combination with the cover plate 30.

More specifically, as shown in FIGS. 3A and 3B, the cover plate 30 is generally made up of a white sheet or first sheet member 25 having a front surface functioning as a document pressing surface or background surface, a black sheet or second sheet member having a reverse surface also functioning as a document pressing surface or background surface, a pair of cushions or elastic members 26 and a transparent sheet or third sheet member 27 having a function other than the functions of the white sheet 25 and black sheet 28. The cushions 26 and transparent sheet 27 are interposed between the white sheet 25 and the black sheet 28. The cushions 26, in practice, each are provided with preselected thickness great enough to implement preselected elasticity although shown as being a simple sheet in FIGS. 3A and 3B.

The white sheet 25, black sheet 28, cushions 26 and transparent sheet 27 sandwiched between the cushions 26 are adhered together by two-sided adhesive tapes, constituting the cover plate 30. Stated another way, the transparent sheet or third sheet 27 is held between two cushions or elastic members 26 at substantially the intermediate between the white sheet or first sheet 25 and the black sheet or second sheet 28 in the direction of thickness of the sheets 25 and 28.

The white sheet 25, transparent sheet 27 and black sheet 28 are formed of, e.g., suitable resin in consideration of durability, mechanical strength and coloring ability (except for the transparent sheet 27) required. The cushions 26 are formed of urethane foam or similar foam material.

Three hook and loop fasteners 29 are positioned on each of the front and reverse surfaces of the transparent sheet 27 at the front and rear edges as viewed in FIGS. 3A and 3B, i.e., twelve hook and loop fasteners 29 in total are positioned on the sheet 27. In the illustrative embodiment, the hook and loop fasteners 29 are fuzzy loops. The size of the transparent sheet 27 in the widthwise direction of a document, which is at least part of the sheet 27, is greater than the size of the white sheet 27 and black sheet 28. With this configuration, the transparent sheet 27 is fitted on the body of the document reading device, i.e., on the reverse surface of the ADF 25 in the illustrative embodiment at the outside of the white sheet 25 and black sheet 28, which play the role of a document pressing surface each.

If fixing means is positioned at the inside of the document pressing surface, it should fix the front and rear surfaces in exactly the same manner for the structural reasons and therefore causes the document pressing surface to loose its function as a cover plate or background plate, reducing a document reading area. If the document reading area is not varied, then the entire device must be increased in size.

Figure 4:
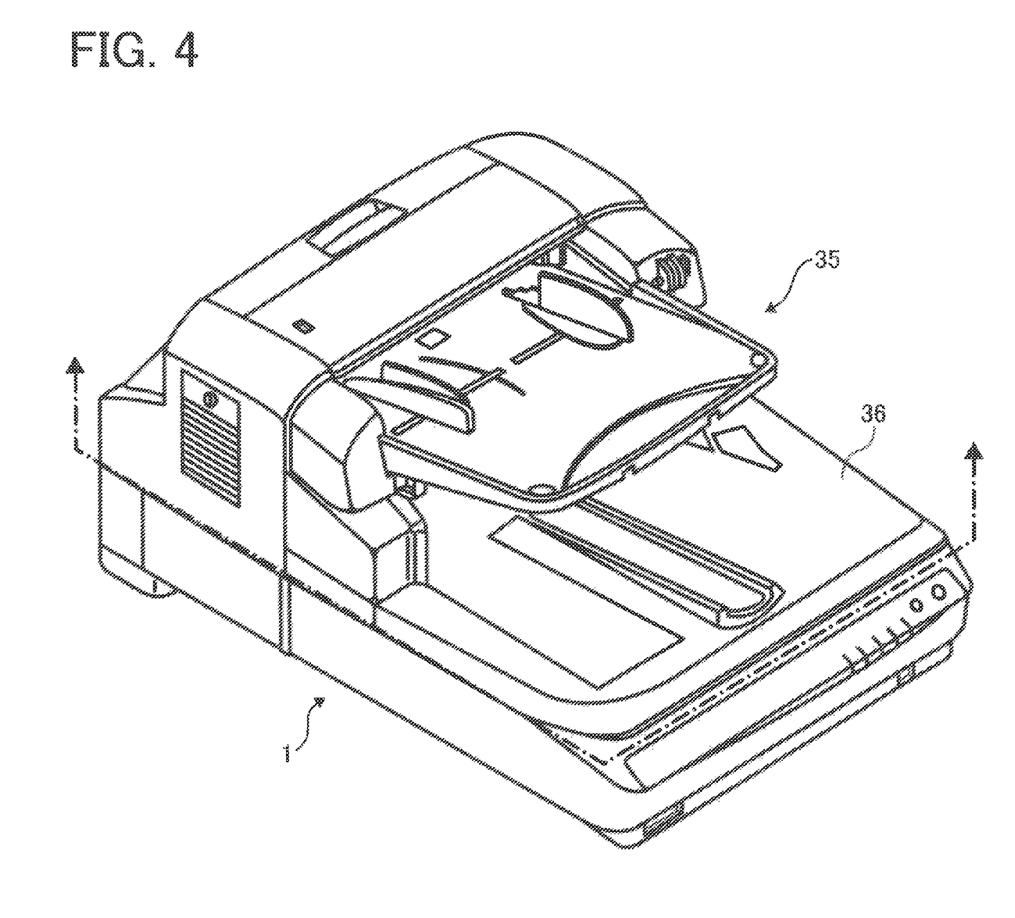
FIG. 4 is an isometric view showing an ADF mounted on the document reading device of the illustrative embodiment.

In the illustrative embodiment, as shown in FIG. 4, the ADF or automatic document feeding means 35 is mounted on the top of the document reading device 1 in such a manner as to be openable, or angularly movable, away from the glass platen 5 about a fulcrum positioned at the rear left of the device 1, as indicated by a dash-and-dot arrow. The ADF 35 is opened when a document should be laid on the glass platen 5.

How the cover plate 30 is mounted to the reverse surface of the ADF 35 will be described hereinafter. As shown in FIG. 5, spiky hooks 37, forming the other part of hook and loop fasteners, are fitted on the reverse surface of an ADF base 36. The cover plate 30 is removably mounted to the reverse surface of the ADF 35 with its fuzzy loops 29 mating with the spiky hooks 37 and can therefore be turned upside down. In FIG. 4, the cover plate 30 is positioned on the ADF 35 such that the white sheet 25 constitutes the document pressing surface. In this configuration, the loops 29 and hooks 37 constitute mounting/dismounting means for mounting or dismounting the cover plate 30 to or from the ADF 35.

As stated above, the cover plate 30 is mounted to the ADF 35 via the loops 29 and hooks 37, constituting hook and loop fasteners or mounting/dismounting means in combination, such that the white sheet 25 and black sheet 28 can be selectively positioned to face the reading surface of the glass platen 5, as desired.

FIG. 5 shows the document reading device 1 with the ADF 35 being removed. As shown, a document is positioned on the glass platen 5 by being abutted against the contact reference 21 of the main-scan scale mentioned earlier and the contact reference 22 of a subscan scale. The contact references 21 and 22 are used as references when the cover plate 30 is mounted to the ADF 35 as well.

Figure 7:
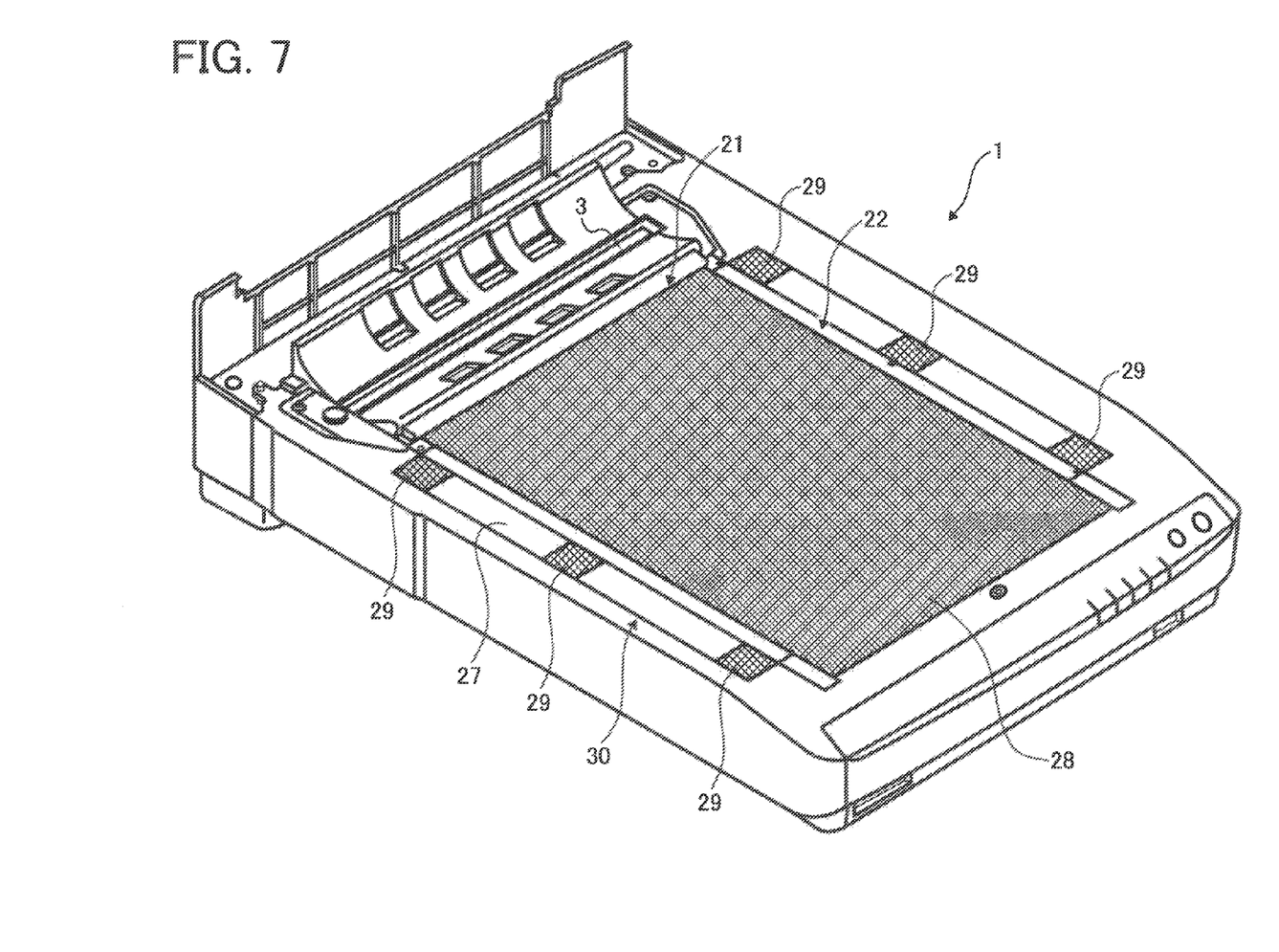
FIG. 7 is an isometric view demonstrating how the cover plate is mounted to or dismounted from the ADF after the ADF has been removed from the document reading device.

More specifically, to mount the cover plate 30 to the ADF 35, the operator opens the ADF 35 without the cover plate 30 away from the glass platen 35. Subsequently, as shown in FIG. 7, the operator sets the cover plate 30 on the glass platen 5 while watching, through the transparent sheet 27, the edges of the white sheet 25 (not visible in FIG. 7 because it is positioned at the bottom of the cover plate 7) and those of the black sheet 28 being abutted against the main-scan scale contact reference 21 and subscan scale contact reference 22. The operator then slowly closes the ADF 35 onto the cover plate 30. As a result, the loops 29 and hooks 37 of the hook and loop fasteners mate with each other, affixing the cover plate 30 to the ADF base 36. Preferably, the operator thus closed the ADF 35 should again open it and press the loops 29 and hooks 37 in order to insure the fixation.

As shown in FIG. 7, to use white background in the event of reading, the operator lays the cover plate 30 on the glass platen 5 such that the white sheet 25 faces downward on the glass platen 5, i.e., the black sheet 28 faces upward. To use black background, the operator lays the cover plate 30 on the glass platen 5 such that the black sheet 28 faces downward on the glass platen 5. At this instant, because the transparent sheet 27 is located at the intermediate position of the cover plate 30 in the direction of thickness of the cover plate 30, the distance between the transparent sheet 27 and the white sheet 25 or the black sheet 28 remains the same without regard to which of the sheets 25 and 28 is positioned to face the glass platen 5, allowing the cover plate 30 to exert the same pressure on a document laid on the glass platen 5.

As stated above, in the illustrative embodiment, the cover plate or document pressing member 30 may be regarded as part of the ADF or document pressing means 35 that elastically presses a document against the reading surface of the glass platen 5.

The ADF 35 included in the illustrative embodiment is not essential. In the document reading device without the ADF 35 and therefore having a relatively simple, low-cost configuration, the cover plate 30 may be removably mounted to, e.g., a cover plate mounting member or document pressing means, not shown, that presses a document against the reading surface of the glass platen 5. In such a modification of the illustrative embodiment, the cover plate mounting member is usually openably mounted on the body of the document reading device in substantially the same manner as the ADF 35.

Further, even the cover plate mounting member or document pressing means and the hook and loop fasteners 29 and 37 may be omitted, in which case only a cover plate essentially similar in configuration to the cover plate 30, but provided with greater mechanical strength, is hinged to the body of the document reading device at the same position as the ADF 35.

Moreover, for a user needing only white background, another white sheet, forming part of the cover plate 30 shown in FIGS. 3A and 3B, may be substituted for the black sheet 28, in which case two white sheets 25 are positioned on opposite surfaces of the cover plate 30 with the intermediary of the transparent sheet 27 and cushions 26. Likewise, for a user needing only black background, the black sheet 28 may be substituted for the white sheet 25, in which case two black sheets 28 are positioned on opposite surfaces of the cover plate 30 with the intermediary of the transparent sheet 27 and cushions 26.

The modifications of the illustrative embodiment stated above are also capable of implementing a simple way of use matching with the user's need and purpose, and provided with document pressing member with durability two times higher than that of the conventional one-surface document pressing member.

Figure 8:
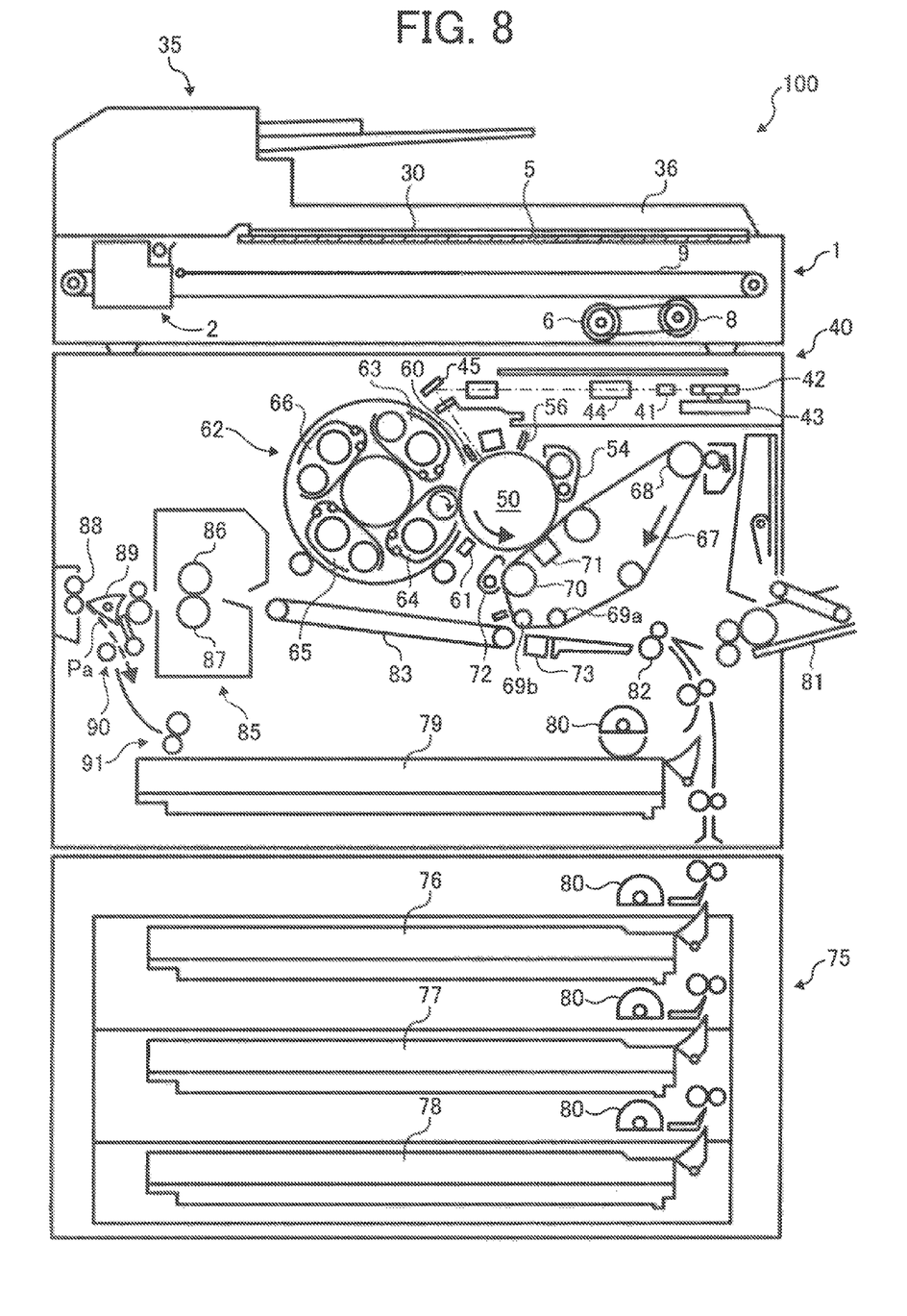
FIG. 8 is a view showing the general construction of a color duplex copier representative of an alternative embodiment of the present invention.

Reference will be made to FIG. 8 for describing an alternative embodiment of the document reading device in accordance with the present invention. As shown, the document reading device 1 is mounted on a color duplex copier 100, which is a specific form of an image forming apparatus.

The color duplex copier 100 is configured to form an image on one surface of a sheet or sheet-like recording medium (simplex image forming mode), reverses the sheet and then form an image on the other surface of the same sheet (duplex image forming mode). The color duplex copier 100 is operable in a thick sheet mode, a monochrome mode and a full-color mode in addition to the simplex and duplex image-forming modes.

As shown in FIG. 8, the color duplex copier 100 includes the document reading device 1 loaded with the ADF 35 and having a color scanner function, an optical writing unit or exposing means 40, a photoconductive drum or image carrier 50, a drum cleaning unit 54, a quenching lamp 56, a potential sensor 60, a revolver type developing unit 62, a density pattern sensor 61, an intermediate image transfer belt 67, a fixing unit 85, a sheet bank 75 and so forth.

The optical writing unit 40 converts color image data output from the document reading device 1 to a corresponding optical signal and optically scans the drum 50 imagewise for thereby forming a latent image on the drum 50. The optical writing unit 40 includes a laser diode 41, a polygonal mirror 42, a motor 43 for causing the polygonal mirror 42 to rotate, an f/θ lens 44, a mirror 45 and so forth.

The drum 45 is caused to rotate counterclockwise, as viewed in FIG. 8, as indicated by an arrow. The drum cleaning unit 54, quenching lamp 56, potential sensor 60, one of four developing sections included in the revolver type developing unit 62, density pattern sensor 61 and intermediate image transfer belt 67 are positioned around the drum 50. In FIG. 8, a cyan developing section 64, included in the developing unit 62, is shown as facing the drum 50 by way of example.

More specifically, the revolver type developing unit (simply developing unit hereinafter) 62 includes a black developing section 63, the cyan developing section 64, a magenta developing section 65, a yellow developing section 66 and drive arrangements, not shown, for causing preselected members of the developing sections 63 through 66 to rotate. The preselected members mentioned above include a sleeve rotatable with a developer, forming a magnet brush on the sleeve, contacting the drum 50, a paddle rotatable for scooping up the developer while agitating it and so forth.

The operation of the color duplex copier 100 will be described hereinafter. The developing unit 62 is initially positioned such that the black developing section 63 faces the drum 50 at a developing position. On the start of a copying operation, the document reading device 1 starts outputting data representative of a black image at preselected timing. The optical writing unit 40 starts optically writing the black image data with a laser beam for thereby forming a latent image or black latent image as referred to hereinafter.

Before the leading edge of the latent image arrives at the position of the black developing section 63, the sleeve included in the black developing section 63 is caused to start rotating in order to develop the black latent image with black toner from the leading edge. As soon as the trailing edge of the black toner image moves away from the black developing section 63, the developing unit 62 is caused to revolve until the next developing section arrives at the developing position. This revolution is completed at least before the leading edge of a latent image based on an image of the next color arrives at the developing position.

More specifically, on the start of an image forming cycle, the drum 50 is rotated counterclockwise, as viewed in FIG. 8, while he belt 67 is caused to turn clockwise, as viewed in FIG. 8, by a motor, not shown, via a gear train or similar drive transmitting means. While the belt 67 is in movement, a black (Bk) toner image, a cyan (C) toner image, a magenta (M) toner image and a yellow (Y) toner image are sequentially formed on the drum 50 while being sequentially transferred from the drum 50 to the belt 67 one above the other by a corona discharger 71 for primary image transfer. As a result, a full-color image is completed on the belt 67.

When a thick sheet mode is selected, a controller, not shown, makes the revolution speed of each drive motor lower than in a mode using sheets other than thick sheets. Conversely, in a monochrome mode, the controller makes the revolution speed of each drive motor higher than in, e.g., a full-color mode.

The belt 67 is passed over a drive roller 68, image-transfer facing rollers 69a and 69b, a cleaning facing roller 70 and a plurality of driven rollers and caused to turn by a drive motor not shown.

The B, C, M and Y toner images sequentially formed on the drum 50 are sequentially transferred to the belt 67 one above the other in accurate register, completing a full-color toner image on the belt 67. The full-color toner image is then transferred from the belt 67 to a sheet by a corona discharger 73 for secondary image transfer.

A plurality of sheet cassettes 76, 77 and 78 are disposed in the sheet bank 75, and each is loaded with a stack of sheets of a particular size different from the size of sheets stored in a sheet cassette 79, which is accommodated in the copier body. A pickup roller 80 pays out sheets of a designated size from the sheet cassette associated therewith toward a registration roller pair 82. The copier 100 additionally includes a manual sheet feed tray 81 for allowing OHP (OverHead Projector) sheets, relatively thick sheets or similar special sheets to be fed by hand.

At the time when image formation begins, the sheet, paid out from the sheet cassettes 76 through 78 or fed from the manual sheet feed tray 81 by hand, is stopped by the nip of the registration roller pair 82 for a moment. When the leading edge of the full-color image formed on the belt 67 arrives at the corona discharger 73, the registration roller 82 is again driven to bring the leading edge of the above sheet into register with the leading edge of the toner image.

When the sheet, being conveyed together with the belt 67, moves over the corona discharger 73, which is connected to a positive potential, the corona discharger 73 transfers the full-color image from the belt 67 to the sheet by charging the sheet to the positive potential with a corona discharge current. Subsequently, a discharge brush, not shown, positioned at the left-hand side of the corona discharger 73, as viewed in FIG. 8, discharges the sheet with the result that the sheet is separated from the belt 67 and transferred to a belt conveyor 83.

The belt conveyor 83 conveys the sheet, carrying the full-color image thereon, to the fixing unit 85. The fixing unit 85 fixes the full-color image on the sheet with heat and pressure as conventional. Subsequently, the sheet or copy, coming out of the fixing unit 85, is conveyed to a path selector 89 positioned on a sheet outlet path between the fixing unit 85 and an outlet roller pair 88. At this instant, the path selector 89 is held in a position indicated by a solid line in FIG. 8. In this condition, the sheet is steered toward the outlet roller pair 88 by the path selector 89, driven out of the copier body by the outlet roller pair 88 and then stacked on a copy tray not shown as a full-color copy.

As stated above, the image forming means for forming a document image read by the document reading device 1 on a sheet is mainly constituted by the optical writing unit 40, photoconductive drum or image carrier 50, drum cleaning unit 54, quenching lamp 56, potential sensor 60, revolver type developing unit 62, density pattern sensor 61, intermediate image transfer belt 67, corona discharger 71 for primary image transfer and corona discharger 73 for secondary image transfer.

In a monochrome mode, one of the developing sections 63 through 66 of the developing unit 62 capable of dealing with a designated color is continuously held operative at the developing position until a desired number of copies have been output. At the same time, the belt 67 is continuously driven forward in contact with the drum 50.

In a duplex copy mode, a monochromatic image or a full-color image is formed on one surface or front surface of a sheet by the procedure described above and then fixed by the fixing unit 85. When the trailing edge of the sheet, thus carrying the fixed image on one surface thereof, is about to leave the outlet roller pair 88, the outlet roller pair 88 is caused to stop rotating and then start rotating in the opposite direction to convey the trailing edge of the sheet into the copier body by so-called switchback.

In the duplex mode, the path selector 89 is driven by a solenoid or similar drive means to a position for steering the sheet, labeled Pa, toward an inlet roller pair 90. The inlet roller pair 90 conveys the sheet Pa to a sheet path 91 on which a plurality of rollers or similar sheet conveying members are arranged. Consequently, the sheet Pa is stacked on a cassette 79 face up, i.e., with the image surface facing upward.

After the desired number of sheets, or simplex copies, Pa have been stacked on the cassette 79 face up, they are sequentially fed by a pickup roller 80 one by one from the cassette 79 toward the registration roller pair 82 in such a position that the reverse surface of each sheet Pa not formed with an image faces upward. After a monochromatic or a full-color image has been formed on the reverse surface of each sheet Pa, the image is again fixed on the sheet Pa by the fixing unit 85. Thereafter, the sheet Pa, thus carrying images on both surfaces thereof, is driven out to the copy tray by the outlet roller pair 88, which is rotated in the forward direction, as a duplex copy.

It should be noted that the document reading device of the present invention is applicable not only to a color duplex copier shown and described, but also to a printer, copier, facsimile apparatus, plotter, stencil printer or similar printer, a multifunction machine or similar image forming apparatus. For example, the embodiment described first, i.e., the document reading device 1 with the ADF 35 to which the cover plate 30 is removably attached may advantageously be substituted for, e.g., a document reading section (7) included in a stencil printer (1) proposed by Japanese patent laid-open publication No. 2003-211813.

In summary, it will be seen that the present invention provides a new, useful document reading device and an image forming apparatus having various unprecedented advantages, as enumerated below.

(1) A document pressing member, e.g., a cover plate for pressing a document is removable from the body of the document reading device and can therefore be easily replaced at low cost when broken or otherwise damaged, enhancing serviceability or operability. This is also true when the document pressing member forms at least part of document pressing means.

(2) When the document pressing member forms at least part of the document pressing means and when mounting/dismounting means for mounting or dismounting the document pressing member to or from the device body is implemented by hook and loop fasteners, the lowest cost is realized.

(3) The removable, document pressing member can be mounted to the device body such that either one of the front and reverse surfaces thereof faces a document table, and achieves durability two times as high as that of a conventional one-surface document pressing member.

(4) The removable, document pressing member includes at least a first sheet member, a second sheet member, a pair of elastic members and a third sheet and can be mounted to the device body via the third sheet member.

(5) Because at least part of the third sheet is sized greater than a document pressing surface, i.e., the first or the second sheet member, a structure for mounting the document pressing member to the device body can be arranged at the outside of the document pressing surface for thereby preventing an image reading area from being reduced or the overall size of the device from being increased.

(6) The third sheet member comprises a transparent sheet member and therefore allows the operator to see, through the sheet member, whether or not the sheet edges of the document pressing member, facing a glass platen or similar document table, are accurately abutted against references, e.g., a main-scan and a subscan scale in the event of mounting of the removable, document pressing member. This successfully prevents the document pressing member from being dislocated at the timing of mounting.

(7) The third sheet member is positioned at substantially the intermediate between the first and second sheet members, which form the front and reverse surfaces or document pressing surfaces, in the direction of thickness and sandwiched between the elastic members. Therefore, the document pressing member can exert the same pressure on a document without regard to which of the front and reverse surfaces faces the glass platen, thereby obviating irregularity in quality ascribable to mounting.

(8) The first and second sheets members are implemented as a white sheet member and a black sheet member, respectively. This not only provides each user with a particular, easy way of use, but also enhances serviceability, i.e., operability.

(9) The advantages (1) through (8) stated above are similarly achievable when automatic document feeding means is mounted on the body of the document reading device or even with an image forming apparatus including the document reading device and image forming means.

Various modifications will become possible for those skilled in the art after receiving the teachings of the present disclosure without departing from the scope thereof.

What is claimed is:

1. A document reading device comprising:
a body;
a document table on which a document is to be laid;
a document reading means including scanning optics for reading an image of the document;
a document pressing member to press the document against a surface of said document table; and
a mounting/dismounting means provided outside the document pressing member for removably mounting said document pressing member to said body,
wherein said document pressing member, which is removable, has a front surface and a reverse surface and is mountable to said body with either one of said front surface and said reverse surface facing the surface of said document table.

2. The device as claimed in claim 1, wherein said document pressing member includes at least a first sheet member having a document pressing surface forming the front surface, a second sheet member having a document pressing surface forming the reverse surface, a pair of elastic members interposed between said first sheet member and said second sheet member and a third sheet member different from said first sheet and said second sheet.

3. The device as claimed in claim 2, wherein at least part of said third sheet is sized greater than the document pressing surfaces.

4. The device as claimed in claim 2, wherein said third sheet includes a transparent sheet.

5. The device as claimed in claim 2, wherein said third sheet member is sandwiched between said pair of elastic members and positioned substantially at the intermediate between said first sheet member and said second sheet member in a direction of thickness.

6. The device as claimed in claim 2, wherein said first sheet member and said second sheet member comprise a white sheet member and a black sheet member, respectively.

7. The device as claimed in claim 1, further comprising an automatic document feeding means mounted on said body in such a manner as to be openable away from said document table, said document pressing member being removably mounted to a portion of said automatic document feeding means facing the surface of said document table.

8. The device as claimed in claim 1, wherein said document reading device is used for an image forming apparatus that includes a document reading device and an image forming means for forming an image of a document read by said document reading device on a sheet-like recording medium.

9. A document reading device comprising:
a body;
a document table on which a document is to be laid;
a document pressing member;
a document reading member which includes scanning optics for reading an image of the document;
a mounting/dismounting device provided outside the document pressing member and configured to removebly mount the document pressing member to said body,
wherein said document pressing member, which is removable, has a front surface and a reverse surface and is mountable to said body with either one of said front surface and said reverse surface facing a surface of said document table.

10. The device as claimed in claim 9, wherein said document pressing member includes at least a first sheet member having a document pressing surface forming the front surface, a second sheet member having a document pressing surface forming the reverse surface, a pair of elastic members interposed between said first sheet member and said second sheet member and a third sheet member different from said first sheet and said second sheet.

11. The device as claimed in claim 10, wherein at least part of said third sheet is sized greater than the document pressing surfaces.

12. The device as claimed in claim 10, wherein said third sheet includes a transparent sheet.

13. The device as claimed in claim 10, wherein said third sheet member is sandwiched between said pair of elastic members and positioned substantially at the intermediate between said first sheet member and said second sheet member in a direction of thickness.

14. The device as claimed in claim 10, wherein said first sheet member and said second sheet member comprise a white sheet member and a black sheet member, respectively.

15. The device as claimed in claim 9, further comprising an automatic document feeding device mounted on said body in such a manner as to be openable away from said document table, said document pressing member being removably mounted to a portion of said automatic document feeding means facing the surface of said document table.

16. An image forming apparatus comprising:
a document reading device; and
an image forming device that forms an image of a document read by said document reading device on a sheet-like recording medium;
said document reading device comprising:
a body;

a document table on which a document is to be laid;
a document reading member which includes scanning optics for reading an image of the document;
a document pressing member that presses the document against a surface of said document table; and
a mounting/dismounting device provided outside said document pressing member for removably mounting said document pressing member to said body, wherein said document pressing member, which is removable, has a front surface and a reverse surface and is mountable to said body with either one of said front surface and said reverse surface facing the surface of said document table.

* * * * *